US 6,757,760 B1

(12) United States Patent
Liu et al.

(10) Patent No.: US 6,757,760 B1
(45) Date of Patent: Jun. 29, 2004

(54) METHOD OF AND APPARATUS FOR DISPATCHING A PROCESSING ELEMENT TO A PROGRAM LOCATION BASED ON CHANNEL NUMBER OF RECEIVED DATA (75) Inventors: Jung-Jen Liu, San Jose, CA (US); Bruce A. Fairman, Woodside, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 612 days.

(21) Appl. No.: 09/670,508

(22) Filed: Sep. 26, 2000

Related U.S. Application Data (63) Continuation-in-part of application No. 09/172,994, filed on Oct. 14, 1998, now Pat. No. 6,167,471.

(51) Int. Cl.[7] .......................... G06F 13/10; G06F 9/30; H04J 3/26; G11C 8/00
(52) U.S. Cl. .......................... 710/100; 710/62; 710/63; 370/464; 455/186.1; 712/208
(58) Field of Search .......................... 710/100, 62, 63, 710/23; 711/100; 370/441, 912, 464; 709/300, 229; 712/200, 225, 208, 244; 455/186.1; 375/316; 340/146.2, 825; 714/2; 348/64

(56) References Cited

U.S. PATENT DOCUMENTS

| 3,836,722 A | 9/1974 | Muller et al. ........... 179/15 BS |
| 3,906,484 A | 9/1975 | Melvin, Jr. et al. ... 340/347 DD |
| 4,218,756 A | 8/1980 | Fraser ........................ 364/900 |
| 4,409,656 A | 10/1983 | Andersen et al. .......... 364/200 |
| 4,493,021 A | 1/1985 | Agrawal et al. ............ 364/200 |
| 4,641,238 A | 2/1987 | Kneib ........................ 364/200 |
| 4,750,149 A | 6/1988 | Miller ........................ 364/900 |
| 4,857,910 A | 8/1989 | Baunach ..................... 340/799 |
| 4,897,783 A | 1/1990 | Nay ............................ 364/200 |
| 4,998,245 A | 3/1991 | Tanaka et al. ............. 370/85.1 |

(List continued on next page.)

FOREIGN PATENT DOCUMENTS

| EP | 0 428 111 A2 | 5/1991 | ........... G06F/13/28 |
| EP | 0 499 394 A1 | 8/1992 | ........... G06F/13/38 |
| EP | 0 588 046 A1 | 3/1994 | ........... G06F/13/38 |
| EP | 0 651 329 A2 | 5/1995 | ............. G06F/9/46 |
| EP | 0 696 853 A2 | 2/1996 | ............. H04B/1/20 |
| GB | 2 275 852 A | 9/1994 | ............ H04N/5/04 |

OTHER PUBLICATIONS

"Fiber Channel (FCS) ATM Interworking: A Design Solution," A. Anzaloni, M. De Sanctis, F. Avaltroni, G. Rulli, L. Proietti and G. Lombardi, Ericsson Fatme R&D Division, Nov. 29, 1993, pp. 1127–1133.

(List continued on next page.)

Primary Examiner—Gopal C. Ray
(74) Attorney, Agent, or Firm—Haverstock & Owens LLP (57) ABSTRACT A dispatching apparatus includes a channel pointer register having storage locations, each with fields for channel number, valid bit, and corresponding instruction pointer which points to instructions for processing data for that channel. When an isochronous channel is allocated for reception, the host programs the channel number and corresponding instruction pointer value into a storage location and sets the corresponding valid bit. When data is received, the channel number is compared to channel numbers within valid storage locations. The data is processed according to instructions located at the corresponding instruction pointer value if there is a channel number match or instructions at the default instruction pointer value if there is no match. Default instructions include broadcasting data received on one channel to appropriate channels, multicasting data, handling errors and exceptions, ignoring a channel, routing data to another channel, monitoring active channels on the bus, and other actions for processing data.

41 Claims, 4 Drawing Sheets

U.S. PATENT DOCUMENTS

| | | | |
|---|---|---|---|
| 5,008,879 A | 4/1991 | Fischer et al. | 370/85.2 |
| 5,191,418 A | 3/1993 | Tran | 358/142 |
| 5,276,684 A | 1/1994 | Pearson | 370/94.1 |
| 5,325,510 A | 6/1994 | Frazier | 395/425 |
| 5,343,469 A | 8/1994 | Ohshima | 370/85.1 |
| 5,359,713 A | 10/1994 | Moran et al. | 395/200 |
| 5,361,261 A | 11/1994 | Edem et al. | 370/85.3 |
| 5,369,773 A | 11/1994 | Hammerstrom | 395/800 |
| 5,400,340 A | 3/1995 | Hillman et al. | 370/105.3 |
| 5,402,419 A | 3/1995 | Osakabe et al. | 370/85.1 |
| 5,412,698 A | 5/1995 | Van Brunt et al. | 375/373 |
| 5,420,573 A | 5/1995 | Tanaka et al. | 340/825.24 |
| 5,465,402 A | 11/1995 | Ono et al. | 455/161.2 |
| 5,493,570 A | 2/1996 | Hillman et al. | 370/105.3 |
| 5,499,344 A | 3/1996 | Elnashar et al. | 395/250 |
| 5,506,846 A | 4/1996 | Edem et al. | 370/94.2 |
| 5,509,126 A | 4/1996 | Oprescu et al. | 395/307 |
| 5,515,329 A | 5/1996 | Dalton et al. | 365/221 |
| 5,519,701 A | 5/1996 | Colmant et al. | 370/60.1 |
| 5,524,213 A | 6/1996 | Dais et al. | 395/200.17 |
| 5,526,353 A | 6/1996 | Henley et al. | 370/60.1 |
| 5,533,018 A | 7/1996 | DeJager et al. | 370/60.1 |
| 5,535,208 A | 7/1996 | Kawakami et al. | 370/84 |
| 5,537,408 A | 7/1996 | Branstad et al. | 370/79 |
| 5,544,324 A | 8/1996 | Edem et al. | 395/200.17 |
| 5,546,553 A | 8/1996 | Robertson et al. | 395/405 |
| 5,548,587 A | 8/1996 | Bailey et al. | 370/60.1 |
| 5,550,802 A | 8/1996 | Worsley et al. | 370/13 |
| 5,559,796 A | 9/1996 | Edem et al. | 370/60 |
| 5,559,967 A | 9/1996 | Oprescu et al. | 395/285 |
| 5,566,174 A | 10/1996 | Sato et al. | 370/84 |
| 5,586,264 A | 12/1996 | Belknap et al. | 395/200.08 |
| 5,594,732 A | 1/1997 | Bell et al. | 370/401 |
| 5,594,734 A | 1/1997 | Worsley et al. | 370/395 |
| 5,602,853 A | 2/1997 | Ben-Michael et al. | 370/474 |
| 5,603,058 A | 2/1997 | Belknap et al. | 395/855 |
| 5,615,382 A | 3/1997 | Gavin et al. | 395/800 |
| 5,617,419 A | 4/1997 | Christensen et al. | 370/471 |
| 5,619,646 A | 4/1997 | Hoch et al. | 395/200.01 |
| 5,632,016 A | 5/1997 | Hoch et al. | 395/200.02 |
| 5,640,392 A | 6/1997 | Hayashi | 370/395 |
| 5,640,592 A | 6/1997 | Rao | 395/825 |
| 5,646,941 A | 7/1997 | Nishimura et al. | 370/389 |
| 5,647,057 A | 7/1997 | Roden et al. | 395/275 |
| 5,652,584 A | 7/1997 | Yoon | 341/89 |
| 5,655,138 A | 8/1997 | Kikinis | 395/808 |
| 5,659,780 A | 8/1997 | Wu | 395/800.19 |
| 5,664,124 A | 9/1997 | Katz et al. | 395/309 |
| 5,668,948 A | 9/1997 | Belknap et al. | 395/200.61 |
| 5,684,954 A | 11/1997 | Kaiserswerth et al. | 395/200.2 |
| 5,687,174 A | 11/1997 | Edem et al. | 370/446 |
| 5,687,316 A | 11/1997 | Graziano et al. | 395/200.2 |
| 5,689,727 A | 11/1997 | Bonke et al. | 395/840 |
| 5,692,211 A | 11/1997 | Gulick et al. | 395/800 |
| 5,696,924 A | 12/1997 | Robertson et al. | 395/412 |
| 5,704,052 A | 12/1997 | Wu et al. | 395/380 |
| 5,706,439 A | 1/1998 | Parker | 395/200.17 |
| 5,708,779 A | 1/1998 | Graziano et al. | 395/200.8 |
| 5,710,773 A | 1/1998 | Shiga | 370/512 |
| 5,752,076 A | 5/1998 | Munson | 395/825 |
| 5,758,075 A | 5/1998 | Graziano et al. | 395/200.8 |
| 5,761,430 A | 6/1998 | Gross et al. | 395/200.55 |
| 5,761,457 A | 6/1998 | Gulick | 395/308 |
| 5,774,683 A | 6/1998 | Gulick | 395/309 |
| 5,781,599 A | 7/1998 | Shiga | 375/376 |
| 5,793,953 A | 8/1998 | Yeung et al. | 395/200.8 |
| 5,815,678 A | 9/1998 | Hoffman et al. | 395/309 |
| 5,828,416 A | 10/1998 | Ryan | 348/512 |
| 5,828,903 A | 10/1998 | Sethuram et al. | 395/817 |
| 5,835,726 A | 11/1998 | Shwed et al. | 395/200.59 |
| 5,835,793 A | 11/1998 | Li et al. | 395/898 |
| 5,848,253 A | 12/1998 | Walsh et al. | 395/309 |
| 5,884,103 A | 3/1999 | Terho et al. | 395/892 |
| 5,938,752 A | 8/1999 | Leung et al. | 710/126 |
| 5,946,298 A | 8/1999 | Okuyama | 370/232 |
| 5,970,236 A | 10/1999 | Galloway et al. | 395/500 |
| 5,987,126 A | 11/1999 | Okuyama et al. | 380/5 |
| 5,991,520 A | 11/1999 | Smyers et al. | 395/280 |
| 6,085,270 A | 7/2000 | Gulick | 710/100 |
| 6,145,016 A | 11/2000 | Lai et al. | 710/4 |
| 6,226,338 B1 | 5/2001 | Earnest | 375/372 |
| 6,516,371 B1 | 2/2003 | Lai et al. | 710/129 |

OTHER PUBLICATIONS

"Data Exchange Adapter for Micro Channel/370," Software Patent Institute, Oct. 1991.

IEEE, "1394 Standard for High Performance Ser. Bus," 1995, USA.

"1394 200 Mb/s PHYsical Layer Transceiver, Product Data Sheet and Application Notes," IBM Microelectronics, Version 1.4, Mar. 14, 1996.

"TSB21LV03 IEEE 1394–1995 Triple Cable Trasceiver/Arbiter," Texas Instruments, Product Preview, Revision 0.99, Mar. 19, 1996.

"The IEEE–1394 High Speed Ser. Bus," R.H.J. Bloks, Philips Journal of Research, vol. 50, No. 1/2, 1996.

"PC 4 intern Systemprogrammierung," Michael Tisher, Data Becker, 1994.

"IEEE 1394, The Cable Connection To Complete The Digital Revolution," Daniel Moore.

"The Parallel Protocol Engine" Matthias Kaiserswerth, IEEE/ACM Transactions on Networking, No. 6, Dec. 1993, New York, pp. 650–663.

"The Programmable Protocol VLSI Engine (PROVE)" A.S. Krishnakumar, W.C. Fischer, and Krishan Sabnani, 8089 IEEE Transactions on Communications, No. 8, Aug. 1994, New York, pp. 2630–2642.

"A Bus on a Diet–The Serial Bus Alternative, An Introduction to the P1394 High Performance Serial Bus," Michael Teener, Apple Computer Inc., Santa Clara, USA Feb. 24, 1992, pp. 316–321.

"Local Area Network Protocol for Autonomous Control of Attached Devices," Software Patent Institute, Jul., 1990.

"Architecture for High Performance Transparent Bridges," Software Patent Institute, Jul., 1992.

"Access to High–Speed LAN via Wireless Media," Software Patent Institute, Database of Software Technologies, Apr., 1993.

"Asynchronous Transfer Mode," Julia L. Heeter, IFSM 651 and 652, Dec.12, 1995.

"The SerialSoft IEEE 1394 Developer Toolkit," Skiptone, Application API and Implementation Examples.

"Data Link Driver Program Design for the IBM Token Ring Network PC Adapter," Gee–Swee Poo and Wilson Ang, Computer Communication, No. 5, Oct. 1989, London, Great Britain, pp. 266–272.

METHOD OF AND APPARATUS FOR DISPATCHING A PROCESSING ELEMENT TO A PROGRAM LOCATION BASED ON CHANNEL NUMBER OF RECEIVED DATA

RELATED APPLICATIONS

This Patent Application a continuation-in-part of U.S. patent application Ser. No. 09/172,994 now U.S. Pat. No. 6,167,471 filed on Oct. 14, 1998 and entitled METHOD OF AND APPARATUS FOR DISPATCHING A PROCESSING ELEMENT TO A PROGRAM LOCATION BASED ON CHANNEL NUMBER OF RECEIVED DATA. U.S. Pat. No. 6,167,471 filed on Oct. 14, 1998 and entitled METHOD OF AND APPARATUS FOR DISPATCHING A PROCESSING ELEMENT TO A PROGRAM LOCATION BASED ON CHANNEL NUMBER OF RECEIVED DATA is also hereby incorporated by reference.

FIELD OF THE INVENTION

The present invention relates to the field of managing the reception of data received by a device. More particularly, the present invention relates to the field of managing the reception of data received on a channel by a device.

BACKGROUND OF THE INVENTION

The IEEE standard, "IEEE 1394 Standard For A High Performance Serial Bus," Draft ratified in 1995, is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. The IEEE 1394-1995 standard bus architecture provides up to sixty-four (64) channels for isochronous data transfer between applications. A six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

The IEEE 1394-1995 standard provides a high-speed serial bus for interconnecting digital devices thereby providing a universal I/O connection. The IEEE 1394-1995 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394-1995 standard is very thin in size compared to other bulkier cables used to connect such devices. Devices can be added and removed from an IEEE 1394-1995 bus while the bus is active. If a device is so added or removed the bus will then automatically reconfigure itself for transmitting data between the then existing nodes. A node is considered a logical entity with a unique identification number on the bus structure. Each node provides an identification ROM, a standardized set of control registers and its own address space.

Figure 1:
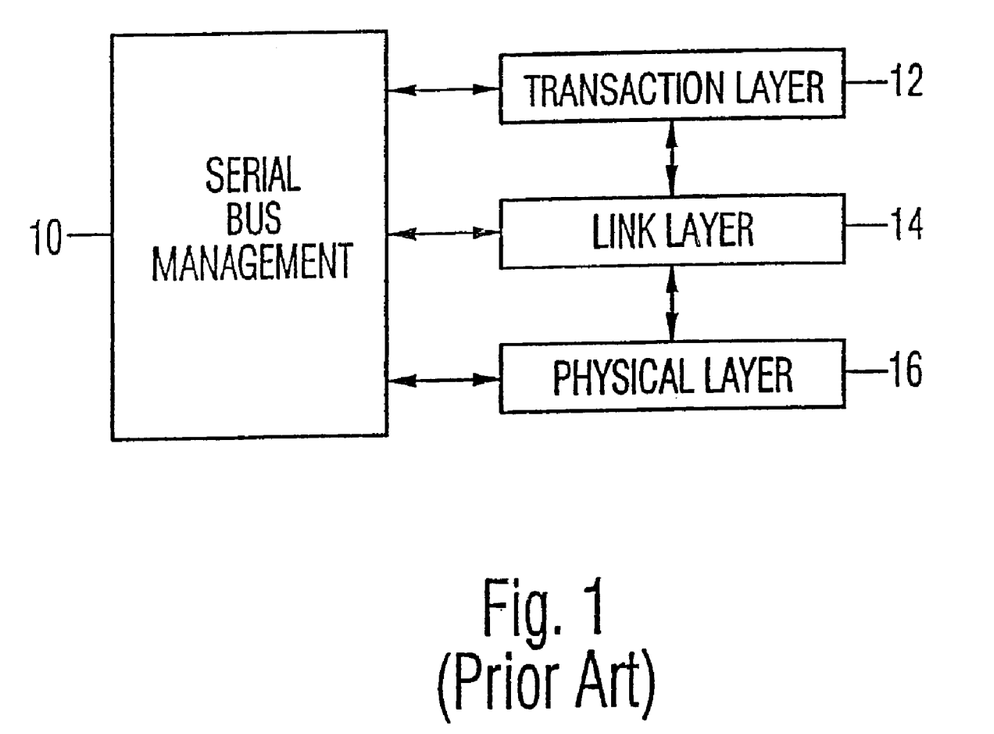
FIG. 1 illustrates a protocol of the IEEE 1394-1995 standard.

The IEEE 1394-1995 standard defines a protocol as illustrated in FIG. 1. This protocol includes a serial bus management block 10 coupled to a transaction layer 12, a link layer 14 and a physical layer 16. The physical layer 16 provides the electrical and mechanical connection between a device or application and the IEEE 1394-1995 cable. The physical layer 16 also provides arbitration to ensure that all devices coupled to the IEEE 1394-1995 bus have access to the bus as well as actual data transmission and reception. The link layer 14 provides data packet delivery service for both asynchronous and isochronous data packet transport. This supports both asynchronous data transport, using an acknowledgement protocol, and isochronous data transport, providing real-time guaranteed bandwidth protocol for just-in-time data delivery. The transaction layer 12 supports the commands necessary to complete asynchronous data transfers, including read, write and lock. The serial bus management block 10 contains an isochronous resource manager for managing isochronous data transfers. The serial bus management block 10 also provides overall configuration control of the serial bus in the form of optimizing arbitration timing, guarantee of adequate electrical power for all devices on the bus, assignment of the cycle master, assignment of isochronous channel and bandwidth resources and basic notification of errors.

As discussed above, an IEEE 1394-1995 device includes the capability to transmit and receive isochronous data over multiple channels. The IEEE 1394-1995 standard provides for up to sixty-four different isochronous channels to be used within an IEEE 1394-1995 network of devices. However, in current implementations, certain IEEE 1394-1995 devices are being built with the capability to only transmit and receive isochronous data over a subset of less than sixty-four channels. When receiving data on an isochronous channel, that data must be processed by the receiving device. This processing includes any or all of displaying, manipulating, forwarding and storing. Often, data received on different isochronous channels is processed differently, depending on the type of device from which the data is received, the type of data that is received and the desired use of the data. If data received on an isochronous channel is not received and processed efficiently, errors in the display or use of the data can result.

SUMMARY OF THE INVENTION

An apparatus for dispatching a processing element to a program location based on a channel number of received data includes a channel pointer register having a number of storage locations each with a channel number field, a valid bit field and a corresponding instruction pointer field. When an isochronous channel is allocated for use for reception, the host device programs the channel number and a corresponding instruction pointer value into a storage location. When a storage location is programmed, a valid bit within that storage location is also preferably set. The corresponding instruction pointer value points to a series of instructions which are to be used to process data received on that isochronous channel. When isochronous data is then received, the channel number on which the data is received is compared to the channel numbers within the valid storage locations in the channel pointer register. If one of the channel numbers within a valid storage location matches the channel number of the received data, then the corresponding instruction pointer value is output and the data is processed according to a series of instructions beginning at the location specified by the corresponding instruction pointer value. Otherwise, if the channel number of the received data does not match any of the channel numbers within valid storage locations then a default instruction pointer value is output and the received data is processed according to a series of instructions beginning at the location specified by the default instruction pointer value. The series of instructions beginning at the location specified by the default instruction pointer value are used to broadcast data received on a single channel on all appropriate channels, multicast data received on a single channel to a select group of channels, handle errors and exceptions related to received data and unprogrammed channel numbers, ignore data received on a channel, route data received on a first channel to one or more different channels, to monitor the active channels on the bus and any other appropriate action to process data received on a channel with no corresponding valid instruction pointer value.

In one aspect of the invention, a method of processing received data having a real-time component comprises receiving data having the real-time component on a received channel number, comparing the received channel number to stored channel numbers within a plurality of memory locations, each of the plurality of memory locations including a corresponding address value specifying a starting address for a series of instructions for processing data received on a corresponding stored channel number, providing the corresponding address value corresponding to the stored channel number matching the received channel number as an output address value if one of the stored channel numbers matches the received channel number and providing a default address value as the output address value if none of the stored channel numbers matches the received channel number. The method further includes allocating an allocated channel number for receiving data and programming the allocated channel number and a corresponding allocated address value into one of the memory locations to form the stored channel number and the corresponding address value for the memory location. The default address value specifies a default starting address for a series of default instructions for processing data received on the received channel number. The series of default instructions controls broadcast of data received on the received channel number out on one or more different channel numbers. The series of default instructions controls multicast of data received on the received channel number out on a group of channel numbers. The series of default instructions handles errors and exceptions related to data received on the received channel number. The series of default instructions ignores data received on the received channel number. The series of default instructions reroutes data received on the received channel number on one or more different channel numbers. The series of default instructions monitors active channels on which data is received. The memory locations are locations within a register. The method further includes programming a valid bit within a programmed memory location. The data is preferably isochronous data. Comparing is performed by a comparator which is provided the stored channel numbers in parallel.

In another aspect of the invention, an apparatus for processing received data having a real-time component comprises a plurality of storage locations each including a channel number field to store a stored channel number and an instruction pointer field to store a stored address value, a comparing circuit coupled to the plurality of storage locations and configured to receive a received channel number on which data having a real-time component is received, wherein the comparing circuit compares the stored channel numbers to the received channel number to determine if any of the stored channel numbers match the received channel number and an output circuit coupled to the comparing circuit and to the plurality of storage locations to provide the stored address value within the storage location having the stored channel number matching the received channel number as an output address value. The comparing circuit compares the stored channel numbers to the received channel number in parallel. The apparatus further comprises a default storage location coupled to the output circuit to store a default address value and provide the default address value as the output address value if none of the stored channel numbers match the received channel number. The default address value specifies a default starting address for a series of default instructions for processing data received on the received channel number. The series of default instructions controls broadcast of data received on the received channel number out on one or more different channel numbers. The series of default instructions controls multicast of data received on the received channel number out on a group of channel numbers. The series of default instructions handles errors and exceptions related to data received on the received channel number. The series of default instructions ignores data received on the received channel number. The series of default instructions reroutes data received on the received channel number on one or more different channel numbers. The series of default instructions monitors active channels on which data is received. The storage locations further each include a valid bit. The storage locations are programmable. The apparatus further comprises a host device coupled to the plurality of storage locations to program the stored channel numbers and the stored address values. The host device sets the valid bit within the storage location when the storage location is programmed. The apparatus further comprises a processing device coupled to the output circuit to receive the output address value, wherein the output address value specifies a beginning location for a series of instructions to be used to process the data received on the received channel number. The data is preferably isochronous data.

In another aspect of the invention, a receiving device configured to receive data from one or more remote devices comprises an interface circuit configured to receive data on one or more received channel numbers, a plurality of storage locations each including a channel number field to store a stored channel number, an instruction pointer field to store a stored address value and a valid bit having a first state and a second state, wherein when the valid bit for a storage location is in the first state the storage location is valid, a comparing circuit coupled to the interface circuit and to the plurality of storage locations to receive the received channel number corresponding to received data and compare the stored channel numbers to the received channel number to determine if any of the stored channel numbers match the received channel number, a default storage location for storing a default address value and an output circuit coupled to the comparing circuit, to the plurality of storage locations and to the default storage location to provide the stored address value within the storage location having the stored channel number matching the received channel number as an output address value, if one of the stored channel numbers within valid storage locations matches the received channel number, and to provide the default address value as the output address value if none of the stored channel numbers within the valid storage locations match the received channel number, wherein the default address value specifies a default starting address for a series of default instructions for processing data received on the received channel number. The comparing circuit compares the stored channel numbers to the received channel number in parallel.

The comparing circuit only compares stored channel numbers within the valid storage locations to the received channel number. The storage locations are programmable. The host device sets the valid bit within the storage location when the storage location is programmed. The receiving device further comprises a processing device coupled to the output circuit to receive the output address value, wherein the output address value specifies a beginning location for a series of instructions to be used to process the data received on the received channel number. The series of default instructions controls broadcast of data received on the received channel number out on one or more different channel numbers. The series of default instructions controls multicast of data received on the received channel number out on a group of channel numbers. The series of default instructions handles errors and exceptions related to data received on the received channel number. The series of default instructions ignores data received on the received channel number. The series of default instructions reroutes data received on the received channel number on one or more different channel numbers. The series of default instructions monitors active channels on which data is received.

DETAILED DESCRIPTION OF THE PREFERRED EMBODIMENT

An apparatus for dispatching a processing element to a program location based on a channel number of received data includes a channel pointer register. The channel pointer register includes a number of storage locations each having a channel number field, a valid bit field and a corresponding instruction pointer field. Each of the storage locations is programmed by a host device when the host device allocates an isochronous channel and expects to begin receiving data on the isochronous channel. When a storage location within the channel pointer register is programmed, the channel number on which the host device expects to receive isochronous data is written into the channel number field and a corresponding instruction pointer value is written into the instruction pointer field. The corresponding instruction pointer value is a program location preferably recognized by an isochronous data pipe (IDP), which includes program instructions for processing of data received on this isochronous channel. When a storage location is programmed with a channel number and corresponding instruction pointer value, the valid bit within the valid bit field is set to a logical high voltage level. Only storage locations with a valid bit having a value equal to a logical low voltage level can be programmed. When the data within a storage location is no longer valid or an isochronous channel has been reallocated, the valid bit within that storage location is reset to a logical low voltage level, signalling that the data within that storage location is no longer valid.

When isochronous data is received by the host device, the host device determines on which channel the isochronous data has been received. This channel number is then compared to the channel numbers within the valid storage locations in the channel pointer register. If one of the channel numbers within a valid storage location matches the current receive channel number, then the channel pointer register outputs the instruction pointer value within the matching storage location. This instruction pointer value points to a program location. The program instructions beginning at this program location are then used by the host device to process the data received on the current receive channel number. Preferably, the host device utilizes an isochronous data pipe to process the received isochronous data, as taught within U.S. patent application Ser. No. 08/612,322, filed on Mar. 7, 1996 and entitled "ISOCHRONOUS DATA PIPE FOR MANAGING AND MANIPULATING A HIGH-SPEED STREAM OF ISOCHRONOUS DATA FLOWING BETWEEN AN APPLICATION AND A BUS STRUCTURE," which is hereby incorporated by reference. Alternatively, any other appropriate processing device can be used to process the incoming isochronous data.

If none of the channel numbers within the valid storage locations in the channel pointer register match the current receive channel number, then the channel pointer register outputs an instruction pointer default value. This instruction pointer default value points to a default program location. The default program instructions beginning at this program location are then used by the IDP or other appropriate processing device to process the data received on the current receive channel number. The instructions beginning at the location specified by the default instruction pointer value are used to broadcast data received on a single channel on all appropriate channels, multicast data received on a single channel to a select group of channels, handle errors and exceptions related to received data on non-matched channels, ignore data received on a non-matched channel, route data received on a first channel to one or more different channels, monitor the active channels on the bus and any other appropriate action to process data received on a channel with no corresponding valid instruction pointer value.

Figure 2:
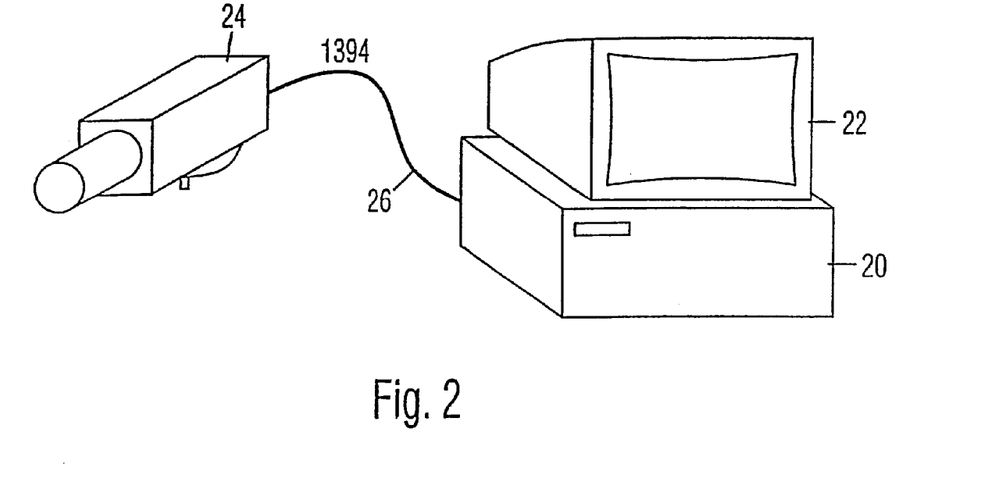
FIG. 2 illustrates an exemplary IEEE 1394-1995 serial bus network including a computer system and a video camera.

An exemplary IEEE 1394-1995 serial bus network implementing the present invention and including a computer system and a video camera is illustrated in FIG. 2. The computer system 20 includes an associated display 22 and is coupled to the video camera 24 by the IEEE 1394-1995 serial bus cable 26. Video data and associated data are sent between the video camera 24 and the computer system 20 over the IEEE 1394-1995 serial bus cable 26.

Figure 3:
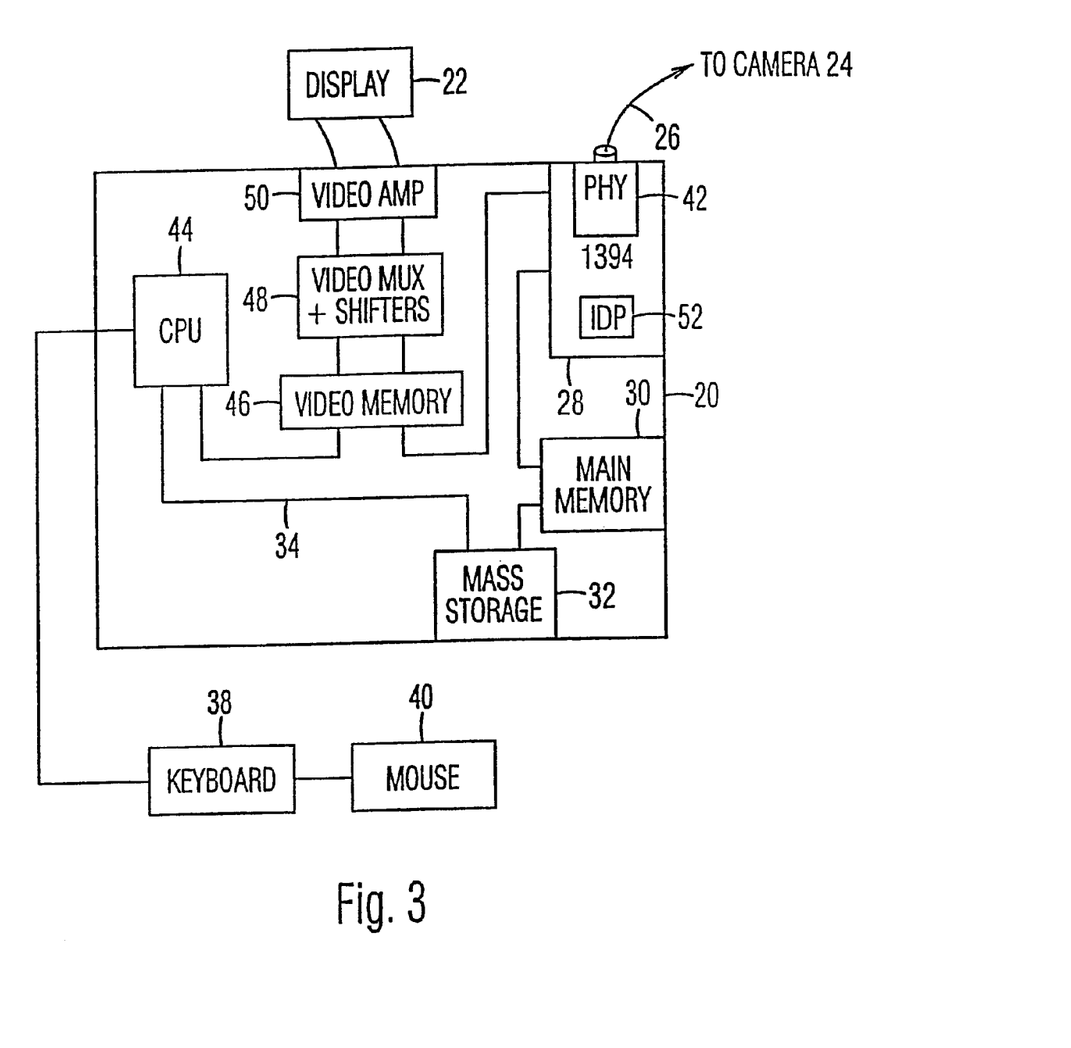
FIG. 3 illustrates a block diagram of the internal components of the computer system 20.

A block diagram of the internal components of the computer system 20 is illustrated in FIG. 3. The computer system 20 includes a central processor unit (CPU) 44, a main memory 30, a video memory 46, a mass storage device 32 and an IEEE 1394-1995 interface circuit 28, all coupled together by a conventional bidirectional system bus 34. The interface circuit 28 includes the physical interface circuit 42 for sending and receiving communications on the IEEE 1394-1995 serial bus and the isochronous data pipe 52 which is used to process streams of isochronous data received and transmitted through the physical interface circuit 42. The physical interface circuit 42 is coupled to the camera 24 over the IEEE 1394-1995 serial bus cable 26. The system bus 34 contains an address bus for addressing any portion of the memory 30 and 46. The system bus 34 also includes a data bus for transferring data between and among the CPU 44, the main memory 30, the video memory 46, the mass storage device 32 and the interface circuit 28.

The computer system 20 is also coupled to a number of peripheral input and output devices including the keyboard 38, the mouse 40 and the associated display 22. The keyboard 38 is coupled to the CPU 44 for allowing a user to input data and control commands into the computer system 20. A conventional mouse 40 is coupled to the keyboard 38 for manipulating graphic images on the display 22 as a cursor control device. As is well known in the art, the mouse 40 can alternatively be coupled directly to the computer 20 through a serial port.

A port of the video memory 46 is coupled to a video multiplex and shifter circuit 48, which in turn is coupled to a video amplifier 50. The video amplifier 50 drives the display 22. The video multiplex and shifter circuitry 48 and the video amplifier 50 convert pixel data stored in the video memory 46 to raster signals suitable for use by the display 22.

Figure 4:
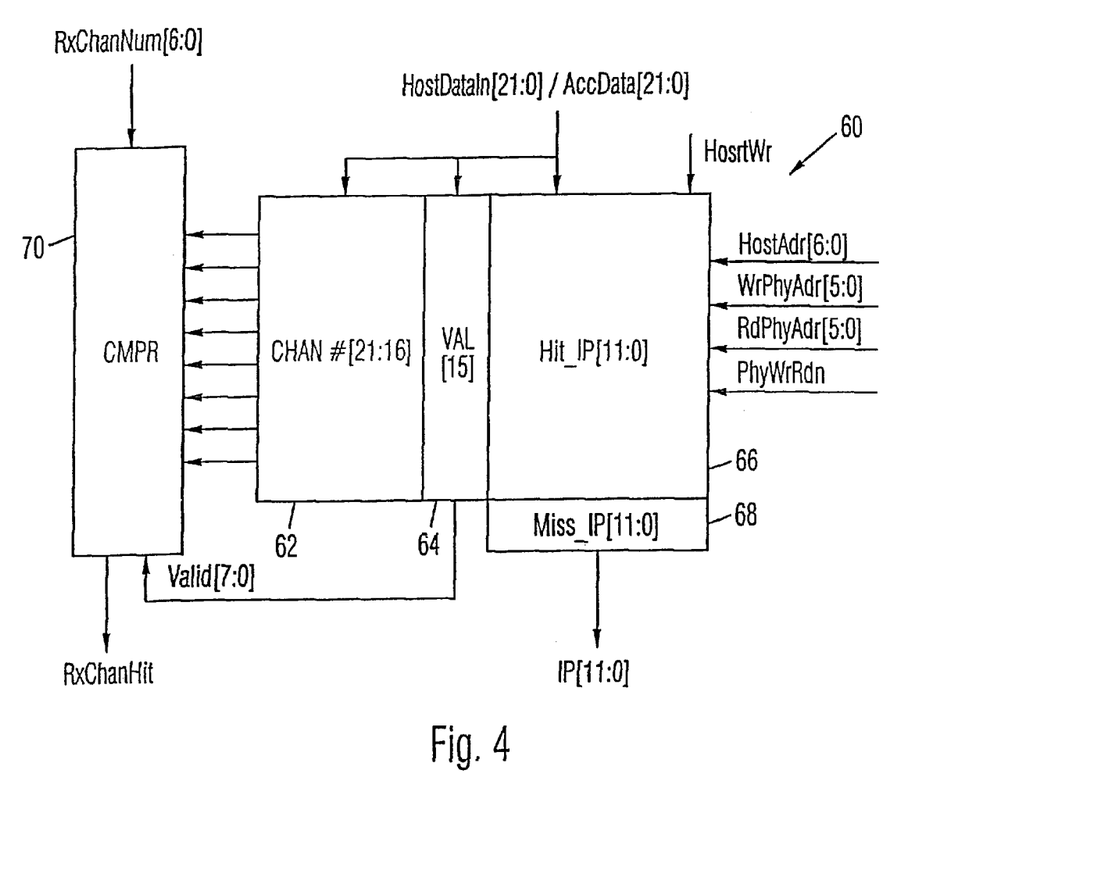
FIG. 4 illustrates a channel pointer register according to the preferred embodiment of the present invention.

The channel pointer register of the present invention is illustrated in FIG. 4. Preferably, the channel pointer register resides within the main memory 30 of the host device. Alternatively, the channel pointer register is provided within a dedicated register. The channel pointer register 60 is preferably a twenty-two bit register having eight storage locations each including a channel number field 62, a valid bit field 64 and a corresponding instruction pointer field 66. A corresponding instruction pointer value is stored within the corresponding instruction pointer field 66 in bits 0 through 11 of the storage location. The valid bit is stored within the valid bit field 64 in bit 15 of the storage location. The channel number is stored within the channel number field 62 in bits 16 through 21 of the storage location. Bits 12–14 of the storage locations are preferably reserved for future use. The channel pointer register 60 also includes a default instruction pointer value storage location 68 in which a default instruction pointer value is stored for use when the channel number of received data does not match any of the valid channel numbers stored within the channel pointer register 60.

A host data input signal HostDataIn is coupled to the channel pointer register 60 in order to program the storage locations within the channel pointer register 60. The host data input signal HostDataIn is provided by the host device to program the storage locations with the appropriate data for isochronous channels on which the host device is receiving data. A host write strobe input HostWr is coupled to the channel pointer register 60 for strobing data into the channel pointer register 60. A host address input signal HostAdr is provided by the host and specifies at which storage location within the channel pointer register 60 the data on the host data input signal HostDataIn is to be written. The channel pointer register 60 provides a twelve-bit instruction pointer output signal IP, depending on the channel number of the received data.

The storage locations within the channel pointer register 60 are also read from and written to by an arithmetic logic unit (ALU) within the IDP 52 or other processing element within the host device. An accumulator data input signal AccData is also coupled to the channel pointer register 60 to program storage locations within the channel pointer register 60. A write physical address input signal WrPhyAdr, a read physical address input signal RdPhyAdr and a register physical write/read strobe input signal PhyWrRdn are coupled to the channel pointer register 60 and used by the ALU to read from and write data to the storage locations within the channel pointer register 60.

Each storage location within the channel pointer register 60 is coupled to a channel number comparator 70 for comparing the channel numbers within the channel pointer register 60 with the channel number on which the host device is currently receiving data. The valid bit values for each storage location within the channel pointer register 60 are also provided to the channel number comparator 70 on the signal lines Valid. Using the valid bit values provided on the signal lines Valid, the channel number comparator 70 can readily determine which storage locations within the channel pointer register 60 include a valid channel number and corresponding instruction pointer. A six-bit receive channel number input signal RxChanNum is coupled to the channel number comparator 70. The receive channel number input signal RxChanNum is provided from the IDP 52 or other processing element within the host device and specifies the channel number on which data is currently being received. A receive channel hit output signal RxChanHit is provided from the channel number comparator 70. The receive channel hit output signal RxChanHit is activated and raised to a logical high voltage level by the comparator 70 when the isochronous channel on which data is currently being received matches a channel number within one of the valid storage locations in the channel pointer register 60. The receive channel hit output signal RxChanHit is deactivated and pulled to a logical low voltage level by the comparator 70 when the isochronous channel on which data is currently being received does not match any of the channel numbers within the valid storage locations in the channel pointer register 60.

When programming a storage location within the channel pointer register 60, the host device puts the data to be written into the storage location on the host data input signal HostDataIn. The host device also provides the address of the storage location to be written to on the host address input signal HostAdr. When the address of the storage location within the channel pointer register is on the host address input signal HostAdr and the data to be written into the storage location is on the host data input signal HostDataIn, the host device then activates the host write strobe signal HostWr. When the host write strobe signal HostWr is activated, the data on the host data input signal HostDataIn is written into the storage location within the channel pointer register 60 specified by the host address input signal HostAdr. In this manner, the storage locations within the channel pointer register 60 are programmed by the host device.

The data written into the storage location includes the channel number value which is written into the channel number field 62 and the corresponding instruction pointer value which is written into the instruction pointer field 66. When a storage location is programmed with a channel number value and a corresponding instruction pointer value, the valid bit is also set signalling that the data within that storage location is valid for the channel number specified. During programming, different channel numbers are written into the channel number field 62 of different storage locations.

When receiving data, the channel number on which the data is received is provided to the comparator 70 on the receive channel number input signal RxChanNum. The comparator 70 then compares the channel number received on the receive channel number input signal RxChanNum to the channel numbers within the valid storage locations in the channel pointer register 60. If one of the channel numbers within a storage location having a valid bit set to a logical high voltage level matches the channel number on the receive channel number input signal RxChanNum, then the instruction pointer value stored within that storage location is output on the instruction pointer output signal IP. Also, if one of the channel numbers within a valid storage location matches the channel number input on the receive channel input signal RxChanNum, then the comparator raises the receive channel hit output signal RxChanHit to a logical high voltage level, signalling that the received channel number was matched. Otherwise, if none of the channel numbers within valid storage locations match the channel number input on the receive channel input signal RxChanNum, then the default instruction pointer value stored within the default instruction pointer value storage location 68 is output on the instruction pointer output signal IP and the comparator 70 pulls the receive channel hit output signal RxChanHit to a logical low voltage level, signalling that the received channel number was not matched.

The value output on the instruction pointer output signal IP is preferably provided to the IDP 52. The IDP 52 runs a set of programmed instructions to process the incoming isochronous data, beginning at the address specified by the instruction pointer output signal IP. Alternatively, any other processing device can be used to process the data and execute the series of instructions starting at the address specified by the instruction pointer output signal IP.

As described above, when none of the channel numbers within valid storage locations match the channel number input on the receive channel input signal RxChanNum, then the default instruction pointer value stored within the default instruction pointer value storage location 68 is output on the instruction pointer output signal IP and the comparator 70 pulls the receive channel hit output signal RxChanHit to a logical low voltage level, signalling that the received channel number was not matched. The default instruction pointer value stored within the default instruction pointer value storage location 68 points to a series of default instructions used to process data received on a channel for which there is no matching channel number within a valid storage location. The default instruction pointer value and the series of default instructions are programmed by the host device, as described above.

The default instructions are used to process data received on a channel for which there is no matching channel number within a valid storage location. The default series of instructions beginning at the location specified by the default instruction pointer value are used to broadcast data received on a single channel on all appropriate channels, multicast data received on a single channel to a select group of channels, handle errors and exceptions related to received data and unprogrammed channel numbers, ignore data received on a channel, route data received on a first channel to one or more different channels, to monitor the active channels on the bus and any other appropriate action to process data received on a channel with no corresponding valid instruction pointer value.

When the default series of instructions is used to broadcast data received on a single channel, data received on a channel for which there is no matching channel number within a valid storage location, is transmitted to all appropriate channels. As an example of a broadcast of data, the data can be broadcast to all active channels for which there is no matching channel number. To broadcast the data in this manner, the host device programs the default series of instructions to broadcast the data received on a channel for which there is no matching channel number to all appropriate channels. When data is received on a channel for which there is no matching channel number, the default instruction pointer value is output on the instruction pointer output signal IP and provided to the IDP 52. The IDP 52 then runs the default series of instructions which broadcasts the data received on the non-matched channel out to all of the appropriate channels.

When the default series of instructions is used to multicast data received on a single channel, data received on a channel for which there is no matching channel number within a valid storage location, is transmitted to a select group of channels. As an example of a multicast of data, the data can be multicast to active channels 1–3. To multicast the data in this manner, the host device programs the default series of instructions to multicast the data received on a channel for which there is no matching channel number to the channels within the select group of channels. When multicasting the data in this manner, there is preferably a software filter within the default series of instructions which specifies the appropriate ones of the active channels to be included in the multicast. When data is received on a channel for which there is no matching channel number, the default instruction pointer value is output on the instruction pointer output signal IP and provided to the IDP 52. The IDP 52 then runs the default series of instructions, implementing the software filter, and multicasts the data received on the non-matched channel out to the channels within the select group of channels.

The default series of instructions can also be used to handle errors and exceptions that occur when receiving data. In this case, when data is received on a channel for which there is no matching channel number within a valid storage location, an error condition occurs and the default series of instructions is used to handle the error. In this example, the default series of instructions is programmed by the host device to handle errors and exceptions that occur in the reception of data on non-matched channel numbers. When data is received on a channel for which there is no matching channel number, the default instruction pointer value is output on the instruction pointer output signal IP and provided to the IDP 52. The IDP 52 then runs the default series of instructions and handles the error or exception occurring in the reception of data on the non-matched channel.

The default series of instructions can also be used to ignore data received on a channel, when the data is received on a channel for which there is no matching channel number within a valid storage location. As an example, when data is received on a channel for which there is no matching channel number within a valid storage location, the default series of instructions is run in order to discard the data received on that non-matched channel. The default series of instructions is programmed by the host device to ignore data received on a channel for which there is no matching channel number within a valid storage location. When data is received on a channel for which there is no matching channel number, the default instruction pointer value is output on the instruction pointer output signal IP and provided to the IDP 52. The IDP 52 then runs the default series of instructions in order to ignore the channel and discard any data received on that non-matched channel.

The default series of instructions can also be used to route data received on a first channel to either a different location or out on a different channel. As an example, when data is received on a channel for which there is no matching channel number within a valid storage location, the default series of instructions is run in order to change the channel number within the data and retransmit the data on a different channel. In this same manner, the data can also be either broadcast or multicast, as described above, on multiple channels. To re-route the data in this manner, the host device programs the default series of instructions to change the channel number for data received on a channel for which there is no matching channel number to the appropriate one or more channels on which the data is to be retransmitted. When data is received on a channel for which there is no matching channel number, the default instruction pointer value is output on the instruction pointer output signal IP and provided to the IDP 52. The IDP 52 then runs the default series of instructions, thereby changing the channel number within the data and retransmits the data on the appropriate one or more channels.

The default series of instructions can also be used to monitor the active channels on the IEEE 1394-1995 serial bus network. As an example, when data is received on a channel for which there is no matching channel number within a valid storage location, the default series of instructions is run in order to determine the channel number and whether or not that non-matched channel number is already known to be active. If it is determined that the channel number is already known to be active, then the channel number is ignored. If it is determined that it is not known that the channel number is active, then the channel number is added to a list of active channel numbers. In this manner, the active channel numbers on the IEEE 1394-1995 serial bus network can be monitored. In this example, the default series of instructions is programmed by the host device to appropriately monitor the bus activity and the active channels on the IEEE 1394-1995 serial bus network. When data is received on a channel for which there is no matching channel number, the default instruction pointer value is output on the instruction pointer output signal IP and provided to the IDP 52. The IDP 52 then runs the default series of instructions in order to determine the non-matched channel number and add the channel number to the list of active channels, if it is not already on the list.

When an isochronous channel is allocated between the host device and a remote device on the IEEE 1394-1995 serial bus network, the host device programs the channel number and the corresponding instruction pointer value into a storage location within the channel pointer register 60 for the allocated channel. The corresponding instruction pointer value points to a series of instructions which are to be performed on data received on that channel. The host device also sets the valid bit for that storage location. When data is then received on the allocated channel, the IDP 52 or other processing element within the host device provides the channel number to the comparator 70. The comparator 70 then compares the channel number to the channel numbers within valid storage locations in the channel pointer register 60. If the channel number matches a channel number within a valid storage location, then the instruction pointer value within that storage location is output on the instruction pointer output signal IP. The IDP within the host device then processes the isochronous data received on that channel according to the series of instructions at the location specified by the instruction pointer output signal IP.

Otherwise, if the channel number does not match a channel number within a valid storage location, then the default instruction pointer value within the default storage location 68 is output on the instruction pointer output signal IP. Preferably, the IDP within the host device then processes the isochronous data received on that channel according to the series of instructions starting at the location specified by the default instruction pointer value. The instructions beginning at the location specified by the default instruction pointer value are used to broadcast data received on a single channel on all appropriate channels, multicast data received on a single channel to a select group of channels, handle errors and exceptions related to received data on non-matched channels, ignore data received on a non-matched channel, route data received on a first channel to one or more different channels, monitor the active channels on the bus and any other appropriate action to process data received on a channel with no corresponding valid instruction pointer value.

Using the method and apparatus of the present invention, a host device can efficiently process incoming isochronous data. The host device programs channel numbers and corresponding instruction pointer values into the channel pointer register 60. When data is then received on an isochronous channel, the channel number on which that data is received is input to the comparator 70 and compared with the channel numbers in valid storage locations within the channel pointer register 60. If one of the channel numbers within a valid storage location matches the channel number of the received data, then the corresponding instruction pointer value is output and the data is processed according to a series of instructions beginning at the location pointed to by the corresponding instruction pointer value. If the channel number of the received data does not match any of the channel numbers within valid storage locations in the channel pointer register then the default instruction pointer value is output and the data is processed according to a series of instructions beginning at the location pointed to by the default instruction pointer value.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that while the preferred embodiment of the present invention is used with an IEEE 1394-1995 serial bus structure, the present invention could also be implemented on any other appropriate bus structures.

We claim:

1. A method of processing received data having a real-time component comprising:
   a. receiving data having the real-time component on a received channel number;
   b. comparing the received channel number to stored channel numbers within a plurality of memory locations, each of the plurality of memory locations including a corresponding address value specifying a starting address for a series of instructions for processing data received on a corresponding stored channel number;
   c. providing the corresponding address value corresponding to the stored channel number matching the received channel number as an output address value if one of the stored channel numbers matches the received channel number; and
   d. providing a default address value as the output address value if none of the stored channel numbers matches the received channel number.

2. The method as claimed in claim 1 further comprising:
   a. allocating an allocated channel number for receiving data; and
   b. programming the allocated channel number and a corresponding allocated address value into one of the memory locations to form the stored channel number and the corresponding address value for the memory location.

3. The method as claimed in claim 1 wherein the default address value specifies a default starting address for a series of default instructions for processing data received on the received channel number.

4. The method as claimed in claim 3 wherein the series of default instructions controls broadcast of data received on the received channel number out on one or more different channel numbers.

5. The method as claimed in claim 3 wherein the series of default instructions controls multicast of data received on the received channel number out on a group of channel numbers.

6. The method as claimed in claim 3 wherein the series of default instructions handles errors and exceptions related to data received on the received channel number.

7. The method as claimed in claim 3 wherein the series of default instructions ignores data received on the received channel number.

8. The method as claimed in claim 3 wherein the series of default instructions reroutes data received on the received channel number on one or more different channel numbers.

9. The method as claimed in claim 3 wherein the series of default instructions monitors active channels on which data is received.

10. The method as claimed in claim 1 wherein the memory locations are locations within a register.

11. The method as claimed in claim 1 further comprising programming a valid bit within a programmed memory location.

12. The method as claimed in claim 1 wherein the data is isochronous data.

13. The method as claimed in claim 1 wherein comparing is performed by a comparator which is provided the stored channel numbers in parallel.

14. An apparatus for processing received data having a real-time component comprising:
   a. a plurality of storage locations each including a channel number field to store a stored channel number and an instruction pointer field to store a stored address value;
   b. a comparing circuit coupled to the plurality of storage locations and configured to receive a received channel number on which data having a real-time component is received, wherein the comparing circuit compares the stored channel numbers to the received channel number to determine if any of the stored channel numbers match the received channel number; and
   c. an output circuit coupled to the comparing circuit and to the plurality of storage locations to provide the stored address value within the storage location having the stored channel number matching the received channel number as an output address value.

15. The apparatus as claimed in claim 14 wherein the comparing circuit compares the stored channel numbers to the received channel number in parallel.

16. The apparatus as claimed in claim 14 further comprising a default storage location coupled to the output circuit to store a default address value and provide the default address value as the output address value if none of the stored channel numbers match the received channel number.

17. The apparatus as claimed in claim 16 wherein the default address value specifies a default starting address for a series of default instructions for processing data received on the received channel number.

18. The apparatus as claimed in claim 17 wherein the series of default instructions controls broadcast of data received on the received channel number out on one or more different channel numbers.

19. The apparatus as claimed in claim 17 wherein the series of default instructions controls multicast of data received on the received channel number out on a group of channel numbers.

20. The apparatus as claimed in claim 17 wherein the series of default instructions handles errors and exceptions related to data received on the received channel number.

21. The apparatus as claimed in claim 17 wherein the series of default instructions ignores data received on the received channel number.

22. The apparatus as claimed in claim 17 wherein the series of default instructions reroutes data received on the received channel number on one or more different channel numbers.

23. The apparatus as claimed in claim 17 wherein the series of default instructions monitors active channels on which data is received.

24. The apparatus as claimed in claim 14 wherein the storage locations further each include a valid bit.

25. The apparatus as claimed in claim 14 wherein the storage locations are programmable.

26. The apparatus as claimed in claim 25 further comprising a host device coupled to the plurality of storage locations to program the stored channel numbers and the stored address values.

27. The apparatus as claimed in claim 26 wherein the host device sets the valid bit within the storage location when the storage location is programmed.

28. The apparatus as claimed in claim 14 further comprising a processing device coupled to the output circuit to receive the output address value, wherein the output address value specifies a beginning location for a series of instructions to be used to process the data received on the received channel number.

29. The apparatus as claimed in claim 14 wherein the data is isochronous data.

30. A receiving device configured to receive data from one or more remote devices comprising:
   a. an interface circuit configured to receive data on one or more received channel numbers;
   b. a plurality of storage locations each including a channel number field to store a stored channel number, an instruction pointer field to store a stored address value and a valid bit having a first state and a second state, wherein when the valid bit for a storage location is in the first state the storage location is valid;
   c. a comparing circuit coupled to the interface circuit and to the plurality of storage locations to receive the received channel number corresponding to received data and compare the stored channel numbers to the received channel number to determine if any of the stored channel numbers match the received channel number;
   d. a default storage location for storing a default address value; and
   e. an output circuit coupled to the comparing circuit, to the plurality of storage locations and to the default storage location to provide the stored address value within the storage location having the stored channel number matching the received channel number as an output address value, if one of the stored channel numbers within valid storage locations matches the received channel number, and to provide the default address value as the output address value if none of the stored channel numbers within the valid storage locations match the received channel number, wherein the default address value specifies a default starting address for a series of default instructions for processing data received on the received channel number.

31. The receiving device as claimed in claim 30 wherein the comparing circuit compares the stored channel numbers to the received channel number in parallel.

32. The receiving device as claimed in claim 30 wherein the comparing circuit only compares stored channel numbers within the valid storage locations to the received channel number.

33. The receiving device as claimed in claim 30 wherein the storage locations are programmable.

34. The receiving device as claimed in claim 33 wherein the host device sets the valid bit within the storage location when the storage location is programmed.

35. The receiving device as claimed in claim 30 further comprising a processing device coupled to the output circuit to receive the output address value, wherein the output address value specifies a beginning location for a series of instructions to be used to process the data received on the received channel number.

36. The receiving device as claimed in claim 30 wherein the series of default instructions controls broadcast of data received on the received channel number out on one or more different channel numbers.

37. The receiving device as claimed in claim 30 wherein the series of default instructions controls multicast of data received on the received channel number out on a group of channel numbers.

38. The receiving device as claimed in claim 30 wherein the series of default instructions handles errors and exceptions related to data received on the received channel number.

39. The receiving device as claimed in claim 30 wherein the series of default instructions ignores data received on the received channel number.

40. The receiving device as claimed in claim 30 wherein the series of default instructions reroutes data received on the received channel number on one or more different channel numbers.

41. The receiving device as claimed in claim 30 wherein the series of default instructions monitors active channels on which data is received.

* * * * *